US008255747B1

(12) United States Patent
Meinsen

(10) Patent No.: US 8,255,747 B1
(45) Date of Patent: Aug. 28, 2012

(54) SYSTEM AND METHOD FOR PROVIDING RESOLUTIONS FOR ABNORMALLY ENDED JOBS ON A MAINFRAME COMPUTER SYSTEM

(75) Inventor: David Meinsen, Independence, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1227 days.

(21) Appl. No.: 10/999,557

(22) Filed: Nov. 30, 2004

(51) Int. Cl.
*G06F 11/00* (2006.01)
(52) U.S. Cl. ........ 714/46; 714/38.1; 714/38.14; 714/25; 714/37; 717/124; 707/713
(58) Field of Classification Search ............... 707/1, 3, 707/10, 713; 714/2, 25–32, 38, 33, 34, 37, 714/48, 38.1–38.14, 46; 717/124
See application file for complete search history.

(56) References Cited

U.S. PATENT DOCUMENTS

| | | | |
|---|---|---|---|
| 5,412,801 A | | 5/1995 | De Remer et al. |
| 5,452,449 A | * | 9/1995 | Baldwin et al. ................ 1/1 |
| 5,649,196 A | | 7/1997 | Woodhill et al. |
| 5,872,970 A | * | 2/1999 | Pickett et al. ............... 718/101 |
| 5,983,364 A | * | 11/1999 | Bortcosh et al. ............ 714/25 |
| 6,571,270 B1 | | 5/2003 | Lai et al. |
| 7,191,364 B2 | * | 3/2007 | Hudson et al. .......... 714/38.11 |
| 7,487,406 B2 | * | 2/2009 | Kobrosly et al. ............ 714/49 |
| 7,681,181 B2 | * | 3/2010 | Canning et al. ............ 717/127 |
| 2004/0128583 A1 | * | 7/2004 | Iulo et al. ................... 714/25 |
| 2004/0153791 A1 | * | 8/2004 | Arend ........................ 714/26 |
| 2005/0278397 A1 | | 12/2005 | Clark |

OTHER PUBLICATIONS

Ubiquity, "Software Inventors for IBM z/OS" white paper, Oct. 2000, 6 pages.
Non-Final Office Action date mailed Jun. 29, 2007 for U.S. Appl. No. 10/999,510.
Response filed Sep. 28, 2007 to Non-Final Office Action date mailed Jun. 29, 2007 for U.S. Appl. No. 10/999,510.
Final Office Action date mailed Dec. 31, 2007 for U.S. Appl. No. 10/999,510.
RCE/Response filed Mar. 30, 2008 to Final Office Action date mailed Dec. 31, 2007 for U.S. Appl. No. 10/999,510.
Non-Final Office Action date mailed Jun. 27, 2008 for U.S. Appl. No. 10/999,510.
Response filed Sep. 29, 2008 to Non-Final Office Action date mailed Jun. 27, 2008 for U.S. Appl. No. 10/999,510.
Final Office Action date mailed Dec. 11, 2008 for U.S. Appl. No. 10/999,510.

(Continued)

*Primary Examiner* — King Poon
*Assistant Examiner* — Lawrence Wills
(74) *Attorney, Agent, or Firm* — Swanson & Bratschun, L.L.C.

(57) ABSTRACT

The present invention relates to a system method for automatically providing resolutions for abnormal end codes from a mainframe system. An abnormal end code for a mainframe computer system is received from a user. A storage device is accessed to determine if there is a resolution for the abnormal end code. If there is a resolution for the abnormal end code, the resolution is provided to the user. If there is not a resolution for the abnormal end code, it is determined what question should be asked of the user. The question and the answer to the question received for the abnormal end code help determine the correct resolution for the abnormal end code.

27 Claims, 3 Drawing Sheets

OTHER PUBLICATIONS

Notice of Appeal and Appeal Brief filed Mar. 11, 2009 in U.S. Appl. No. 10/999,510.
Notification of Non-Compliant Appeal Brief date mailed Apr. 7, 2009 in U.S. Appl. No. 10/999,510.
Appeal Brief filed Apr. 21, 2009 in U.S. Appl. No. 10/999,510.
Examiner's Answer to Appeal Brief date mailed Jul. 22, 2009 in U.S. Appl. No. 10/999,510.
Response filed Sep. 22, 2009 to Examiners Answer dated Jul. 22, 2009 in U.S. Appl. No. 10/999,510.
Order Returning Undocketed Appeal to the Examiner from BAPI date mailed Oct. 28, 2009 in U.S. Appl. No. 10/999,510.
Notice of Defective Appeal Brief date mailed Dec. 1, 2009 in U.S. Appl. No. 10/999,510.
Reply Brief filed Dec. 8, 2009 in U.S. Appl. No. 10/999,510.

* cited by examiner

ENTER THE ABEND CODE? B37
IS THIS A GSAM FILE? Y
SPACE ALLOCATION WAS EXCEEDED
GSAM FILES SHOULD BE PREALLOCATED IN A PREVIOUS STEP

FIND THE FILE THAT CAUSED THE B37 IN THE IEC030I MESSAGE
INCREASE THE PRIMARY AND SECONDARY SPACE ALLOCATION FOR
THAT DATA SET USING OPTION 2 THEN 5 ON THE NEXT SCREEN
RESTART THE JOB IN THE ABENDING STEP
***

SYSTEM AND METHOD FOR PROVIDING RESOLUTIONS FOR ABNORMALLY ENDED JOBS ON A MAINFRAME COMPUTER SYSTEM

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of computer programming. More particularly, the present invention provides a new and useful method for providing resolutions for abnormally ended job codes in a mainframe system.

BACKGROUND OF THE INVENTION

Computer users 104 using a mainframe computer system 102, such as the one shown in FIG. 1, commonly run into problems when utilizing the system. When a problem occurs the user is often notified that a job has abnormally ended or abended and given an abnormal end or "abend" code. The term "job" is used to describe a process to be carried out on a computer.

Prior solutions require the user to contact database administration 106 to help resolve the problem. The user would provide a human database administrator 106 with the abnormal end code they received. The database administrator would assist the user in fixing the problem by asking the user questions regarding the abnormal end code received and the problem. The human database administrator would look up the abnormal end code, see if there were any questions to ask the user, and based upon the abnormal end code and the answers provided by the user, suggest a solution to the user. This process is time consuming and costly as it requires human database administrators to conduct research to help solve the problem in the mainframe system.

What is needed is a system and method for resolving problems on the mainframe computer system that does not involve human administrators and is more efficient. It would be beneficial to have a system and method for providing resolutions to abnormal end code problems in a mainframe computing system automatically.

SUMMARY OF THE INVENTION

In one embodiment, the present invention relates to a method for automatically providing resolutions for abnormal end codes from a mainframe system. An abnormal end code for a mainframe computer system is received from a user. A storage device is accessed to determine if there is a resolution for the abnormal end code. If there is a resolution for the abnormal end code, the resolution is provided to the user.

In another embodiment, a method for automatically providing resolutions for abnormal end codes from a mainframe system is provided. An abnormal end code for a mainframe computer system is received from a user. A storage device is accessed to determine if there is a resolution for the abnormal end code. If there is not a resolution to the abnormal end, it is determined what question should be asked of the user. The question and the answer to the question for the abnormal end code help determine the correct resolution to the abnormal end code.

In yet another embodiment, a system for automatically providing resolutions for abnormal end codes from a mainframe system is provided. A receiving component receives an abnormal end code for a mainframe computer system from a user. An accessing component accesses a storage device to determine if there is a resolution for the abnormal end code. And a providing component provides the resolution for the abnormal end code.

In still another embodiment of the present invention, a system for automatically providing resolutions for abnormal end codes from a mainframe system. The system comprises means for receiving an abnormal end code for a mainframe computer system from a user and means for accessing a storage device to determine if there is a resolution for the abnormal end code. The system further comprises means for providing the resolution for the abnormal end code.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides a system and method for automatically generating answers and resolutions for abnormally ended jobs from a mainframe computing system. As one of skill in the art will appreciate, the present invention may be embodied as, among other things a method, a medium, or a computer program product. Accordingly, the present invention may take the form of a hardware embodiment, a software embodiment, or an embodiment combining software and hardware. In a preferred embodiment, the present invention takes the form of a computer program product that includes computer-readable instructions embodied on one or more computer-readable media.

Computer-readable media include both volatile and non-volatile media, removable and non-removable media, and contemplates media readable by a computer, database, handheld device, etc. Computers are conventional in nature, having several busses coupling memory and storage units to one or more processes and input/output devices. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, data segments, schema, functions, and other data representations. Computer-storage media include, but are not limited to RAM, ROM, EEPROM, flash memory or other memory technology, CD-ROM, digital versatile disks (DVD), a carrier wave, holographic media or other optical disk storage, magnetic cassettes, magnetic tape, magnetic-disk storage, and other magnetic-storage devices. These memory components can store data momentarily, temporarily, or permanently on both volatile and nonvolatile memory.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless-media technologies. Combinations of the above are included within the scope of computer-readable media.

Figure 1:
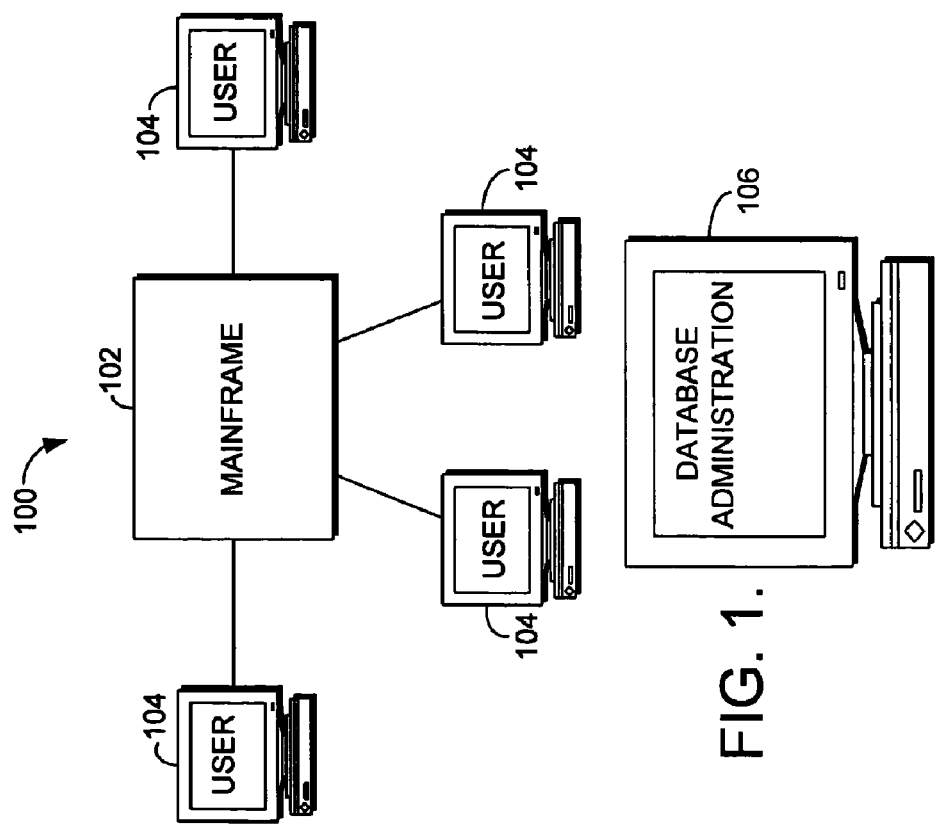
FIG. 1 is a block diagram of an exemplary mainframe computing system to be used in accordance with an embodiment of the present invention.

FIG. 1 illustrates an exemplary mainframe environment 100. Users 104 are connected to the mainframe system 102. When a production job abnormally ends, an abnormal end code is sent from the mainframe 102 to a user 104. Previous solutions required the user 104 to contact database administration 106 to help solve the error in the mainframe system 102.

Figure 2:
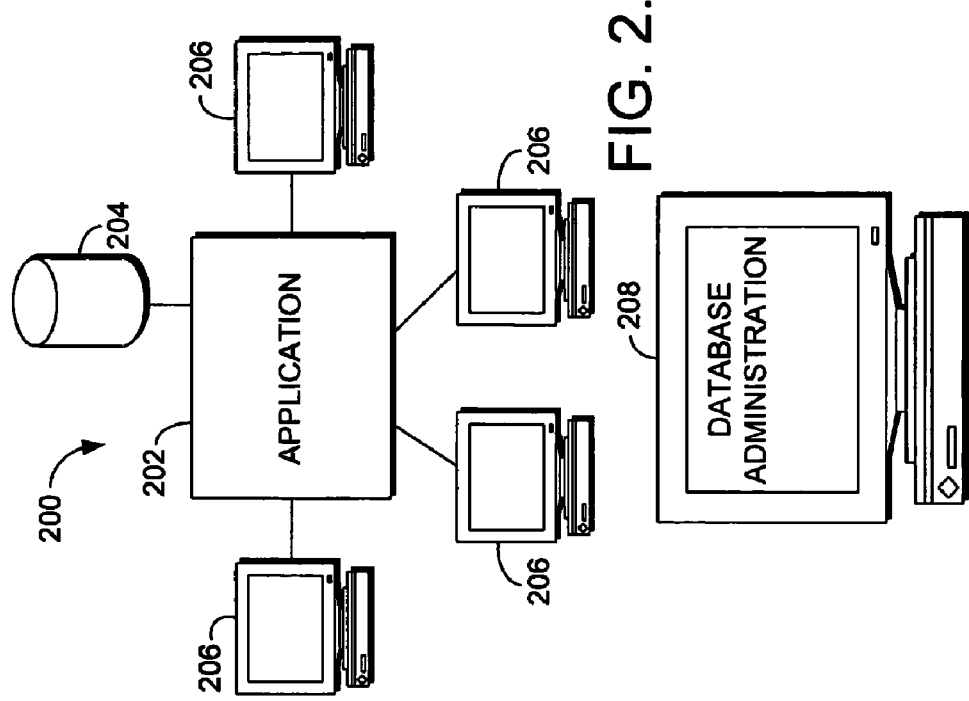
FIG. 2 is a block diagram of a computer system to be used in accordance with an embodiment of the present invention.

With reference to FIG. 2, an exemplary operating environment to practice the present invention is illustrated. All details such as networks and network connections are not included in FIG. 2 due to their conventional nature. Data is stored in storage device 204. Storage device 204 is conventional in nature and can be one or more devices that store data in a database or table(s). Storage device 204 does not need to be connected to a network per se but can be any device including a conventional computer that stores data.

The application 202 utilizes data from the storage device 204 to automatically generate a resolution for the abnormal end code received by a user 206. A user 206 contacts the application 202 and identifies the abnormal end code they received. Application 202 searches a storage device 204 for an answer or resolution to the abnormal end code received by the user 206. If the application cannot determine the resolution or answer to the abnormal end code from database 204, the user 206 is instructed to contact database administration 208.

Figure 3:
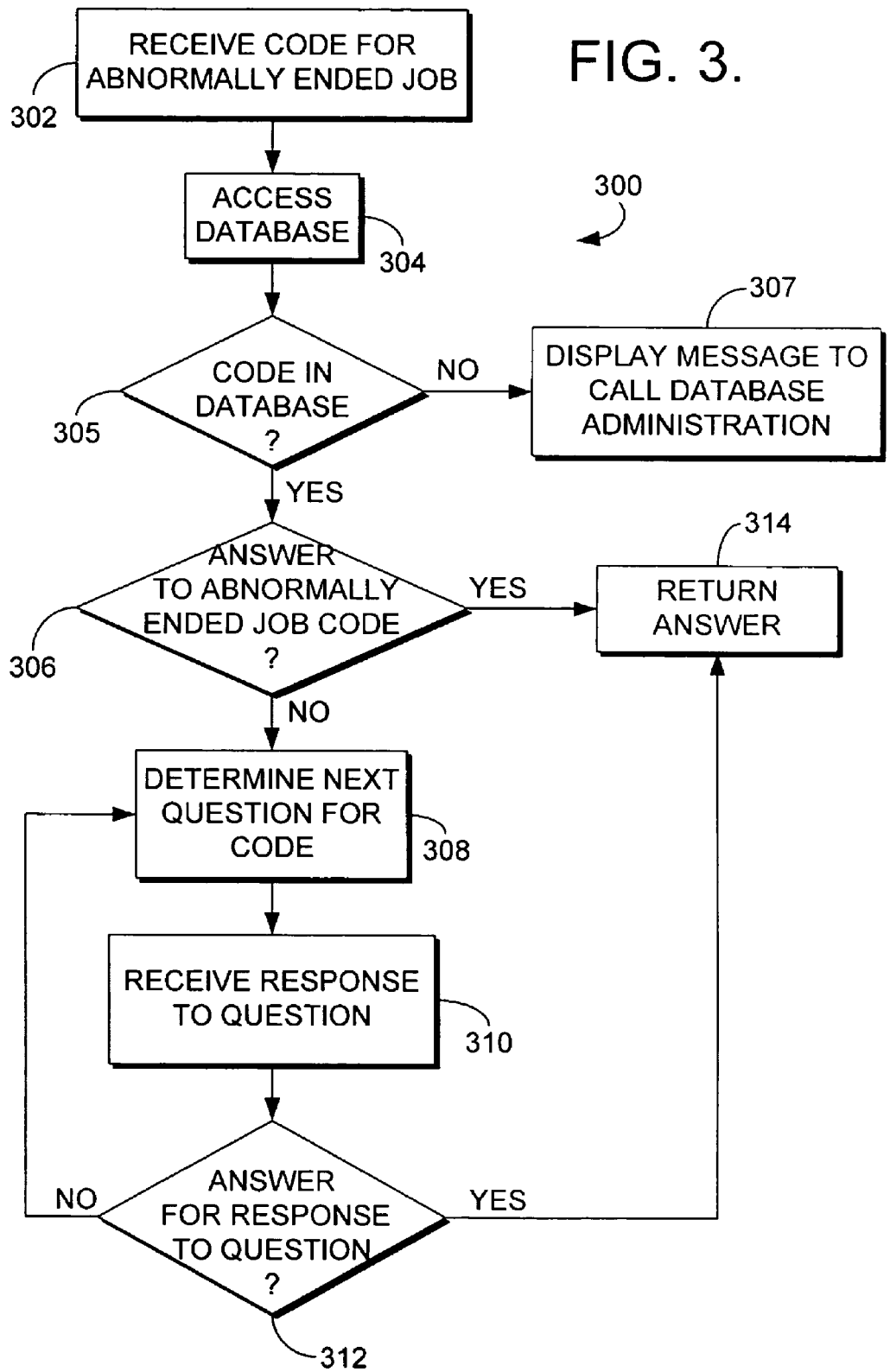
FIG. 3 is a flow diagram describing a method for automatically displaying answers in resolutions to abnormally ended job codes from a mainframe computing system in accordance with an embodiment of the present invention.

With reference to FIG. 3, a method 300 for automatically returning an answer or resolution to an abnormally ended job code is shown. At step 302, a code for an abnormally ended job from the mainframe is received. The code may be entered by a user, such as a user 206 as shown in FIG. 2. At step 304, a database or table is accessed. At step 305, it is determined whether the code entered has corresponding resolutions or questions in the database or table. If the code is not in the database at step 305, then at step 307 a message is displayed for the user to contact database administration to solve the abnormally ended job problem.

However, if at step 305 it is determined that the code is in the database, at decision step 306 it is determined whether an answer exists for the abnormally ended job code. If at step 306 it is determined that an answer exists for the abnormally ended job code and no additional questions need to be asked of the user, at step 314 the answer or resolution is returned to the user. However, if at step 306 it is determined that an answer or resolution to the abnormally ended job code does not exist, without asking additional questions, at step 308, the database or table is accessed to determine the next question for the abnormally ended job code. Preferably, the question asked of the user can be answered with a yes or no response. In one embodiment, the resolutions and questions for the abnormally ended job codes are from IBM or other product manuals.

At step 310, the application receives a response to the question posed from the user. At step 312, it is determined whether an answer exists for the response to the question posed in the database. If so, at step 314 the answer or resolution to the question for the abnormally ended job code is returned. However, if an answer for the response to the question is not available, the next question for the abnormally ended job code will be asked of the user at step 308. This process will continue until an answer to the question posed is determined. Once the answer or resolution to the abnormally ended job code is provided to the user, the user can print and follow the instructions at step 314 to resolve the abnormally ended job code. If another screen is required to resolve the abnormally ended job code, the user will be taken to the screen such as a TSO screen. If no resolution is found for a code, the user will be told to contact database administration.

Figures 4, 5:
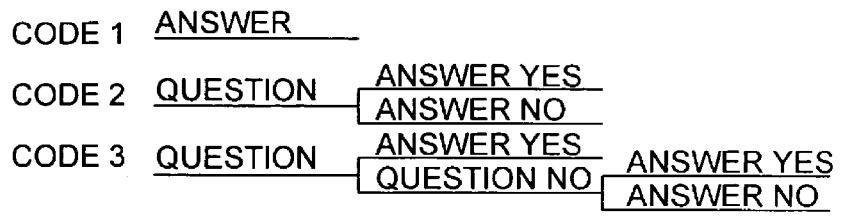
FIG. 4 is an exemplary question tree that may be used with an embodiment of the present invention.
FIG. 5 is a screen depicting automatically generated questions and resolutions for abnormally ended codes in a mainframe computing system in accordance with an embodiment of the present invention.

Referring next to FIG. 4, an exemplary answer tree for abnormally ended job codes is shown. For example, if a user were to enter code 1 into the application, an answer or resolution to the problem would automatically be returned. If the user were to enter code 2, a question would be posed of the user requiring the user to answer either yes or no. An answer would be provided to the user based on whether the user answered yes or answered no to the question posed. If the user enters code 3, a question is posed to the user and the user is required to answer yes or no. If the user's answer is yes, the answer or resolution to the problem is provided to the user. However, if the answer to the question is no, an additional question is asked of the user. Based on the user's response to the second questioned posed, an answer will be provided depending on whether the user has answered yes or no to the second question.

FIG. 5 is a screen displaying a method for entering abnormally ended job codes and providing the resolution for the abnormally ended job code. For example, the abnormally ended job code entered by the user is B37. It is determined that the code is in the storage device and a question is posed to the user. The question posed is "Is this a GSAM file?" The user responds by answering "Y" for "Yes." It is determined that the answer "Yes" to the question posed for the abnormally ended job code 1337 has a resolution and the resolution is printed for use by the user. The resolution for the abnormal end code B37 that is a GSAM file is: that the space allocation was exceeded and GSAM files should be pre-allocated in a previous step. The resolution is that it is to find the file that caused the B37 in the IEC030I message and increase the primary and secondary space allocation for that data set using option 2 then 5 on the next screen. Then the job should be restarted at the abnormally ended step.

Those of skill in the art will appreciate that the present invention can be embodied in a variety of computer application forms or programming languages. The preferred embodiment of the present invention is one or more TSO commands (CLIST). The present invention, however, should not be limited in any way to TSO command (CLIST), but rather as merely an embodiment of the present application. As can be seen from the present invention, its equivalents are well adapted to provide a new and useful method for automatically providing resolutions or answers to abnormally end codes received from a mainframe computing system. Many different arrangements of the components to pick, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of the invention. The skilled programmer may develop alternative means for implementing aforementioned improvements without departing from the scope of the invention.

It will be understood that certain features and subcombinations of utility may be employed without reference to features and subcombinations and contemplated within the scope of the claims. Not all substantive and various figures need to be carried out in the specific order described.

Having briefly described an embodiment of the present invention, an exemplary operating environment for the present invention is described below.

The invention claimed is:

1. A method for automatically providing resolutions for abnormal end codes from a mainframe system, the method comprising:
communicating an abnormal end code generated by a mainframe computer system to a user computer that is separate from, and connected via a network to, the mainframe computer system, in response to a production job ending abnormally, said abnormal end code being an identification symbol representing a particular abnormal end encountered at the mainframe computer system;
receiving the abnormal end code for a mainframe computer system from a user submission submitted by the user from the user computer;
automatically accessing a storage device to address the abnormal end code in response to the user submission, the storage device being enabled to determine if there is a resolution for the abnormal end code generated by the mainframe computer system, determine if there is no resolution for the abnormal end code, and determine if one or more questions are required to determine whether there is a resolution for the abnormal end code;
providing the resolution for the abnormal end code in response to determining there is a resolution for the abnormal end code;
instructing the user at the user computer to contact a database administrator in response to determining there is not a resolution for the abnormal end code; and
generating the one or more questions for communication to the user at the user computer from an answer tree in response to determining questions are required to determine whether there is a resolution, wherein the one or more questions are cumulatively generated a plurality of times and the one or more questions are posed to the user at the user computer until the resolution is determined or a determination is made there is not a resolution.

2. The method of claim 1, wherein potential answers for the one or more questions are communicated to the user with the one or more questions.

3. The method of claim 1, further comprising:
receiving one or more answers to the one or more question from the user.

4. The method of claim 2, further comprising:
determining if there is a resolution for the abnormal end code based on the answer received.

5. The method of claim 4, further comprising:
providing the resolution for the abnormal end code if there is a resolution for the abnormal end code based on the answer received.

6. The method of claim 5, wherein if another screen is required for the resolution, providing the screen to the user.

7. The method of claim 2, further comprising:
printing the resolution for the user, wherein the system utilizes time sharing option (TSO) commands for communicating with the user.

8. The method of claim 7, wherein if the second question should be asked of the user, providing the second question to the user to answer.

9. A computer readable non-transitory medium comprising the method of claim 1.

10. A system for automatically providing resolutions for abnormal end codes from a mainframe system, the system comprising:
a communicating component for communicating an abnormal end code generated by a mainframe computer system to a user computer that is separate from, and connected via a network to, the mainframe computer system, in response to a job ending abnormally, said abnormal end code being an identification symbol representing a particular abnormal end encountered at the mainframe computer system;
a receiving component for receiving the abnormal end code for a mainframe computer system from a user submission submitted by the user from the user computer;
an accessing component for automatically accessing a storage device to address the abnormal end code in response to the user submission, the accessing component being enabled to (1) determine if there is a resolution for the abnormal end code generated by the mainframe computer system, (2) determine if there is no resolution for the abnormal end code, and (3) determine if one or more questions are required to determine whether there is a resolution for the abnormal end code; and
a providing component for (a) providing the resolution for the abnormal end code in response to determining there is a resolution for the abnormal end code, (b) instructing the user at the user computer to contact a database administrator in response to determining there is not a resolution for the abnormal end code, and (c) generating the one or more questions for communication the user at the user computer from an answer tree in response to determining questions are required to determine whether there is a resolution, wherein the one or more questions are cumulatively generated a plurality of times and the one or more questions are posed to the user at the user computer until the resolution is determined or a determination is made there is not a resolution.

11. The system of claim 10, wherein a determining component within the providing component determines if the one or more questions should be asked of the user if there is not a resolution for the abnormal end code.

12. The system of claim 10, wherein the determining component displays the one or more questions to the user utilizing one or more screens.

13. The system of claim 12, further comprising:
printing the resolution for the user.

14. The system of claim 13, wherein the system utilizes time sharing options (TSO) commands for communicating with the user.

15. The system of claim 10, further comprising:
another providing component for providing a screen to the user if another screen is required for the resolution.

16. The system of claim 13, further comprising:

a plurality of determining components for determining whether the one or more questions from the answer tree should be generated for the user.

17. A system for automatically providing resolutions for abnormal end codes from a mainframe system, the system comprising:

means for communicating an abnormal end code associated with a mainframe computer system to a user computer that is separate from, and connected via a network to, the mainframe computer system, in response to a job ending abnormally, said abnormal end code being an identification symbol representing a particular abnormal end encountered at the mainframe computer system;

means for receiving the abnormal end code for a mainframe computer system from a user submission submitted by the user from the user computer;

means for automatically accessing a storage device utilizing an application to address the abnormal end code in response to the user submission, the storage device being enabled to determine if there is a resolution for the abnormal end code generated by the mainframe computer system, determine if there is no resolution for the abnormal end code, and determine if one or more questions are required to determine whether there is a resolution for the abnormal end code;

means for providing the resolution for the abnormal end code in response to determining there is a resolution for the abnormal end code;

means for instructing the user at the user computer to contact a database administrator in response to determining there is not a resolution for the abnormal end code; and means for generating the one or more questions for communication to the user at the user computer from an answer tree in response to determining questions are required to determine whether there is a resolution, wherein the one or more questions are cumulatively generated a plurality of times and the one or more questions are posed to the user at the user computer until the resolution is determined or a determination is made there is not a resolution.

18. The system of claim 17, means for generating generate the one or more questions a plurality of times until the resolution is determined or a determination is made that there is no resolution.

19. The system of claim 18, further comprising:

means for communicating the one or more questions to the user the plurality of times.

20. The system of claim 18, further comprising:

means for receiving one or more answers to the one or more questions from the user.

21. The system of claim 19, further comprising:

means for determining if there is a resolution for the abnormal end code based on the one or more answers received.

22. The system of claim 21, further comprising:

means for providing the resolution for the abnormal end code if there is a resolution for the abnormal end code based on the answer received.

23. The system of claim 22, further comprising:

means for providing a screen to the user if another screen is needed for the resolution.

24. A method for automatically providing resolutions for abnormal end codes from a mainframe system, the method comprising:

communicating an abnormal end code generated by a mainframe computer system to a user computer that is separate from, and connected via a network to, the mainframe computer system, in response to a production job ending abnormally, said abnormal end code being an identification symbol representing a particular abnormal end encountered at the mainframe computer system;

receiving the abnormal end code for a mainframe computer system from a user submission submitted by the user from the user computer;

automatically accessing a storage device to address the abnormal end code in response to the user submission, the storage device being enabled to determine if there is a resolution for the abnormal end code generated by the mainframe computer system, determine if there is no resolution for the abnormal end code, and determine if one or more questions are required to determine whether there is a resolution for the abnormal end code;

providing the resolution for the abnormal end code in response to determining there is a resolution for the abnormal end code;

instructing the user at the user computer to contact a database administrator in response to determining there is not a resolution for the abnormal end code; and communicating the one or more questions for communication to the user at the user computer from an answer tree in response to determining questions are required to determine whether there is a resolution, wherein the one or more questions are cumulatively communicated to the user at the user computer until the resolution is determined or a determination is made there is not a resolution; and receiving answers to the one or more questions.

25. The method of claim 24, wherein if there is a resolution for the abnormal end code, providing the resolution to the user.

26. The method of claim 24, further comprising:

printing the resolution for the user.

27. The method of claim 26, wherein communications to the user are performed utilizing time sharing option (TSO) commands.

* * * * *